US012517083B2

(12) United States Patent
Dick et al.

(10) Patent No.: US 12,517,083 B2
(45) Date of Patent: Jan. 6, 2026

(54) SYSTEM AND METHOD FOR MEASURING ELECTROCHEMISTRY OF DYNAMICALLY DISSOLVING DROPLETS

(71) Applicant: Purdue Research Foundation, West Lafayette, IN (US)

(72) Inventors: Jeffrey Edward Dick, West Lafayette, IN (US); Ashutosh Rana, West Lafayette, IN (US); Christophe Jacques Renault, Chicago, IL (US)

(73) Assignee: Purdue Research Foundation, West Lafayette, IN (US)

( * ) Notice: Subject to any disclaimer, the term of this patent is extended or adjusted under 35 U.S.C. 154(b) by 168 days.

(21) Appl. No.: 18/609,955

(22) Filed: Mar. 19, 2024

(65) Prior Publication Data

US 2024/0310318 A1  Sep. 19, 2024

Related U.S. Application Data

(60) Provisional application No. 63/453,138, filed on Mar. 19, 2023.

(51) Int. Cl.
*G01N 27/413* (2006.01)
*B01L 3/02* (2006.01)
(Continued)

(52) U.S. Cl.
CPC .......... *G01N 27/413* (2013.01); *B01L 3/0241* (2013.01); *G01N 27/30* (2013.01); *G01N 27/48* (2013.01)

(58) Field of Classification Search
CPC .... G01N 27/413; G01N 27/30; G01N 27/333; G01N 27/416; G01N 27/48; B01L 3/0241; B01L 3/502784; B01L 3/502792
See application file for complete search history.

(56) References Cited

U.S. PATENT DOCUMENTS

| 4,737,344 A * | 4/1988 | Koizumi | B01L 3/0262 422/930 |
| 2013/0068622 A1* | 3/2013 | Schertzer | G01N 27/04 204/600 |

(Continued)

OTHER PUBLICATIONS

Ugsomrat et al., "Low-Cost and Disposable Electrowetting-on Dielectric Lab on a Chip With an Integrated Electrochemical Detector Fabricated by Screen-Printing Process," IEEE Sensors Journal, vol. 19, No. 19, Oct. 1, 2019 (Year: 2019).*

(Continued)

*Primary Examiner* — Alexander S Noguerola
(74) *Attorney, Agent, or Firm* — Piroozi-IP, LLC (57) ABSTRACT

A method of measuring ultra-low concentration of a target analyte in a host fluid includes placing a droplet by a micropipette having an ejection tip, positioned by a micropositioner, configured to position the ejection tip atop a first electrode in electrochemical contact with an electrolyte disposed in a first vessel, iteratively applying a potential to the first electrode and measure electrical current between the first electrode and a second electrode in electrochemical contact with the electrolyte, obtaining current vs. voltage curves for each voltameter iteration, identifying redox or oxidation peaks for each voltameter iteration, determining initial target analyte concentration based on the identified redox or oxidation peaks.

20 Claims, 13 Drawing Sheets
(12 of 13 Drawing Sheet(s) Filed in Color)

(51) Int. Cl.
  *G01N 27/30* (2006.01)
  *G01N 27/48* (2006.01)

(56) References Cited

U.S. PATENT DOCUMENTS

2018/0126381 A1* 5/2018 Huff ................ G01N 27/44721
2018/0164577 A1* 6/2018 Dryfe .................... G02B 26/004
2018/0178217 A1* 6/2018 Jebrail ............. B01L 3/502792

OTHER PUBLICATIONS

Popov, "Evaporative deposition patterns: spatial dimensions of the deposit." Physical Review E—Statistical, Nonlinear, and Soft Matter Physics 71.3 (2005): 036313.
Wang et al., "Droplet evaporation-induced analyte concentration toward sensitive biosensing." Materials Chemistry Frontiers 5.15 (2021): 5639-5652.
Rana et al., "Measuring liquid-into-liquid diffusion coefficients by dissolving microdroplet electroanalysis." Analytical Chemistry 95.51 (2023): 18748-18753.
Encarnación Escobar et al., "Zipping-depinning: dissolution of droplets on micropatterned concentric rings." Langmuir 34.19 (2018): 5396-5402.
Zhang et al., "High-density droplet microarray of individually addressable electrochemical cells." Analytical chemistry 89.11 (2017): 5832-5839.
Kurra et al., Electrocondensation and Evaporation of Attoliter Water Droplets: Direct Visualization Using Atomic Force Microscopy, Nano Res. 2010, 3 (5),307-316.
Qian et al., "Surface nanodroplets: formation, dissolution, and applications." Langmuir 35.39 (2019): 12583-12596.
Voci et al., "Abiotic microcompartments form when neighbouring droplets fuse: an electrochemiluminescence investigation", J. E. Chem. Sci. 2023, 14 (9),2336-2341.
Gonçalves et al., "Droplet evaporation on porous fabric materials." Scientific reports 12.1 (2022): 1087.
Knežević et al., "Electrocatalytic amplification of coreactant electrochemiluminescence using redox mediators." Electrochimica Acta 499 (2024): 144677.
Wong et al., "Nanochromatography driven by the coffee ring effect." Analytical chemistry 83.6 (2011): 1871-1873.
Park et al., "Diagnosis of fatty liver disease by a multiphoton-active and lipid-droplet-specific AIEgen with nonaromatic rotors." Materials Chemistry Frontiers 5.4 (2021): 1853-1862.
Kneipp et al., "Single molecule detection using surface-enhanced Raman scattering (SERS)." Physical review letters 78.9 (1997): 1667.
Ding et al., "Quantitative and sensitive SERS platform with analyte enrichment and filtration function." Nano letters 20.10 (2020): 7304-7312.
Benz et al., "Single-molecule optomechanics in "picocavities"." Science 354.6313 (2016): 726-729.
De Angelis et al., "Breaking the diffusion limit with super-hydrophobic delivery of molecules to plasmonic nanofocusing SERS structures." Nature Photonics 5.11 (2011): 682-687.
Lee et al., "Micrometer-sized water droplets induce spontaneous reduction." Journal of the American Chemical Society 141.27 (2019): 10585-10589.
Weatherly et al., "Voltammetric analysis of redox reactions and ion transfer in water microdroplets." Langmuir 36.28 (2020): 8231-8239.
Hermes et al., "The electrochemical oxidation of white phosphorus at a three-phase junction." Electrochemistry communications 2.12 (2000): 845-850.
Wandlowski et al., "Galvani potential scales for water—nitrobenzene and water-1, 2-dichloroethane interfaces." Electrochimica Acta 35.7 (1990): 1173-1175.
Stauber et al., "On the lifetimes of evaporating droplets." Journal of Fluid Mechanics 744 (2014).
Semenov et al., "Evaporation of Sessile Water Droplets in Presence of Contact Angle Hysteresis." Mathematical Modelling of Natural Phenomena 7.4 (2012): 82-98.
Aoki et al., "Electrode reactions at sub-micron oil| water| electrode interfaces." Journal of Electroanalytical Chemistry 542 (2003): 51-60.
Lovrić, "Diffusion from a three-phase junction into a hemispherical droplet." Electrochemistry communications 1.6 (1999): 207-212.
Weatherly et al., "Coupled electron- and phase-transfer reactions at a three-phase interface." Journal of the American Chemical Society 141.45 (2019): 18091-18098.
Fulian et al., "Voltammetry of electroactive oil droplets. Part I: Numerical modelling for three mechanistic models using the dual reciprocity finite element method." Electroanalysis: An International Journal Devoted to Fundamental and Practical Aspects of Electroanalysis 12.13 (2000): 1012-1016.
Scholz et al., "A new access to Gibbs energies of transfer of ions across liquid| liquid interfaces and a new method to study electrochemical processes at well-defined three-phase junctions." Electrochemistry communications 2.2 (2000): 112-118.

* cited by examiner

SYSTEM AND METHOD FOR MEASURING ELECTROCHEMISTRY OF DYNAMICALLY DISSOLVING DROPLETS

CROSS-REFERENCE TO RELATED APPLICATIONS

The present non-provisional patent application is related to and claims the priority benefit of U.S. Provisional Patent Application Ser. 63/453,138, filed Mar. 19, 2023, the contents of which are hereby incorporated by reference in its entirety into the present disclosure.

STATEMENT REGARDING GOVERNMENT FUNDING

This invention was made with government support under CHE 2003587 awarded by the National Science Foundation. The government has certain rights in the invention.

TECHNICAL FIELD

The present disclosure generally relates to electrochemical measurements and in particular to system and method for measuring electrochemistry of dynamically dissolving droplets.

BACKGROUND

This section introduces aspects that may help facilitate a better understanding of the disclosure. Accordingly, these statements are to be read in this light and are not to be understood as admissions about what is or is not prior art.

Droplets are ubiquitous in cosmetic and food industry (better known as emulsion) as well as petroleum engineering, synthesis and drug delivery. Small liquid compartments are also found in living organisms and may play a key role to explain the origin of life. Tracking the dynamics of dissolution of such droplets is critical to design stable product, tune the rate of delivery of a drug, estimate the time for dissolving oil contaminants in the ocean as well as test theories describing thermodynamics and kinetics of droplets. The smaller the droplets, the faster they dissolve. Below 10 µm diameter, a droplet will evaporate within second and thus high-temporal resolution is needed.

Additionally, detection of traces of contaminants requires either an extremely sensitive scheme of detection (e.g., fluorescent detection of single molecules) or a pre-treatment step of the analyte to increase its concentration.

While scanning probe techniques such as atomic force microscope (AFM) have been used to track droplet adsorbed on a surface, and while these scanning probes provide nm resolution the temporal resolution is limited to tens of minutes restricting their use to slow kinetics or stationary systems. Additionally, optical microscopy and mechanical resonators have been used to track directly the size and mass of a dropelet, respectively. These techniques can provide ms time-resolution and track change of size down to few µm. Optical microscopy is nonetheless limited by diffraction limit while mechanical resonators require extremely tedious microfabrication to reach high-sensitivity.

Evaporation (and thus not dissolution) has been used successfully to concentrate an analyte in a droplet. However, the electrochemical measurement requires at least two electrodes that must stay inside the droplet while the droplet is shrinking. This problem has been partially addressed with expensive patterning of the electrodes to control wettability. However, this approach still limits the minimum size of the droplet (and thus pre-concentration and limit of detection) to the size of the two electrodes plus the minimum space needed between them (in the order of several tens of µm).

In all such cases, the current state of the art lacks a straightforward method to manage dissolution of droplets with diameters measured in micrometer, sub-micrometer, or nanometers or detection of such droplets dissolved in a fluid with high temporal resolution.

Therefore, there is an unmet need for a novel system and method capable of measuring electrochemistry of extremely small size droplets in a host fluid with a high temporal resolution.

SUMMARY

A system for measuring ultra-low concentration of a target analyte in a host fluid is disclosed. The system includes a first vessel having an electrolyte disposed therein, a first electrode in electrochemical contact with the electrolyte, a second electrode in electrochemical contact with the electrolyte, a micro-positioner coupled to a micropipette having an ejection tip, and configured to position the ejection tip atop the first electrode such that a droplet having an initial radius comprising of a target analyte in a host fluid can be deposited atop the first electrode, an image capture device configured to capture images of the first electrode with the droplet disposed atop the first electrode as the droplet changes size from the initial radius to radii smaller than the initial radius, until the host fluid is completely dissolved into the electrolyte, a voltameter device coupled between the first electrode and the second electrode and configured to iteratively apply a potential to the first electrode and measure electrical current between the first electrode and the second electrode based on a predetermined voltage sweep rate, and a processor executing software on a non-transient memory. The processor is configured to: obtain current vs. voltage curves for each voltameter iteration, identify redox or oxidation peak for each voltameter iteration based on a predetermined criterion, determine target analyte concentration based on the identified redox or oxidation peaks based on: determine an initial volume of the droplet from the image capture device, convert voltage axis of the current vs. voltage to time based on the predetermined voltage sweep rate, integrate the current values vs. time in the converted current vs. time curves for the associated redox or oxidation curve, determine volume of the droplet at time of the predetermined criterion, and calculate initial concentration of the target analyte in the droplet.

A method of measuring ultra-low concentration of a target analyte in a host fluid, is also disclosed. The method includes placing a droplet by a micropipette having an ejection tip, positioned by a micro-positioner, configured to position the ejection tip atop a first electrode in electrochemical contact with an electrolyte disposed in a first vessel, such that a droplet having an initial radius comprising of a target analyte in a host fluid can be deposited atop the first electrode, iteratively applying a potential to the first electrode and measure electrical current between the first electrode and a second electrode in electrochemical contact with the electrolyte based on a predetermined voltage sweep rate, obtaining current vs. voltage curves for each voltameter iteration, identifying redox or oxidation peaks for each voltameter iteration based on a predetermined criterion, determining target analyte concentration based on the identified redox or oxidation peaks. The determination is based on determining an initial volume of the droplet from an image capture device, converting voltage axis of the current vs. voltage to time based on the predetermined voltage sweep rate, integrating the current values vs. time in the converted current vs. time curves for the associated redox or oxidation curve, and calculating initial concentration of the target analyte in the droplet.

BRIEF DESCRIPTION OF FIGURES

The patent or application file contains at least one drawing executed in color. Copies of this patent or patent application publication with color drawing(s) will be provided by the Office upon request and payment of the necessary fee.

DETAILED DESCRIPTION

For the purposes of promoting an understanding of the principles in the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel method and system are disclosed capable of measuring electrochemistry of extremely small size droplets in a host fluid with a high temporal resolution. Towards this end, we disclose a way to track the dissolution of droplets using electrochemistry with a high temporal resolution. The novel system and method of the present disclosure takes advantage of the spontaneous dissolution of an oil droplet into an aqueous phase to concentrate an analyte by factors of hundreds to thousands within few minutes or tens of minutes. Low cost conventional electrochemical methods are used while reaching unprecedented Limits of Detection.

The approach disclosed herein allows monitoring the rate of dissolution of a single microdroplet using electrochemistry, which provides a convenient, low-cost, and robust technique. Furthermore, the technique disclosed herein also provides a higher time resolution as compared to the existing techniques that use optical microscopy to track the droplet size. For example, the electronics of a potentiostat can easily record currents at a resolution of 1 us, while recording images using an optical microscope at the same resolution is exceedingly difficult.

Additionally, while prior art droplet evaporation requires two electrodes positioned inside the droplet, the system of the present disclosure requires only one electrode, thus eliminating the minimum space needed for two electrodes inside the droplet. Since the pre-concentration of the analyte depends on a change of droplet's volume, any reduction of the size of the electrode (and thus minimum size of the droplet) will lead to an increase (by a power of three) of the pre-concentration. The Limit of Detection is thus improved in proportion.

All aqueous solutions were prepared in ultra-pure water (18.20 MΩ·cm) from a GenPure water purification system (Millipore). 1,2-dichloroethane (1,2-DCE) was obtained from SIGMA ALDRICH (Ward-Hill, MA). Tetrabutylammonium Perchlorate (99% purity), and Decamethyl Ferrocene (Cp*) were obtained from ALDRICH (St. Louis, MO). To prepare the aqueous continuous phase, we used 10 mM of sodium perchlorate (SIGMA ALDRICH) in ultra-pure water, and the droplet contained varying concentrations of Cp* in 1,2-DCE. All reagents were of analytical grade and were used without purification. Glassware was thoroughly cleaned before experimentation with mQ water, acetone (99.9%, SIGMA-ALDRICH, Ward-Hill, MA), and finally with the respective solvent of interest for that solution.

Gold (12.5 um diameter) working electrodes were obtained from CH INSTRUMENTS (Austin, TX). The Ag/AgCl, 1 M KCl aqueous reference electrode was purchased from CH INSTRUMENTS (Austin, TX) and was used as the counter/reference electrode. The working electrodes were polished before use with 0.3 μm alumina powder suspension (ELECTRON MICROSCOPY SCIENCES, Hatfield, PA) on micro-cloth polishing pads (BUEHLER, Lake Bluff, IL) in water, followed by dipping them in piranha solution (a mixture of concentrated sulfuric acid with hydrogen peroxide in a ratio of 3:1 to 7:1). To protect the reference electrode from organic solvents, a salt bridge was made by cooling in a glass tube a 3% agarose solution (99.9%, SIGMA-ALDRICH, Ward-Hill, MA) containing 1 M potassium chloride (FISCHER BIOREAGENTS, Fair Lawn, NJ). The lab-made electrochemical cell was built out of Teflon and cleaned in Piranha solution to remove any trace impurities. The microinjection experiments were performed using a microinjector (FemtoJet 4i eppendorf), which was used to inject tiny droplets into the continuous phase. The position of the microinjector was controlled using an XYZ micro-positioning system (InjectMan 4) and monitored using an optical microscope (mini 2.5X\500 FL-optem fusion micro-imaging lens system). The optical microscope was equipped with a high-resolution sCMOS camera (C15440 ORCAFU-SIONBT, from Hamamatsu, Japan), which enabled optical tracking of the size of the dispensed 1,2-DCE droplets. All electrochemical experiments were performed using a three-electrode system on a CHI 6284E potentiostat (CH INSTRUMENTS, Austin, TX). The working Au electrode was placed at the bottom of the lab-made cell holder. The reference electrode was placed in a compartment containing 1 M KCl (FISHER BIOREAGENTS, Fair Lawn, NJ) and connected to the cell containing the continuous phase by a salt bridge. The reference electrode served as both the reference and counter electrode.

Figure 1:
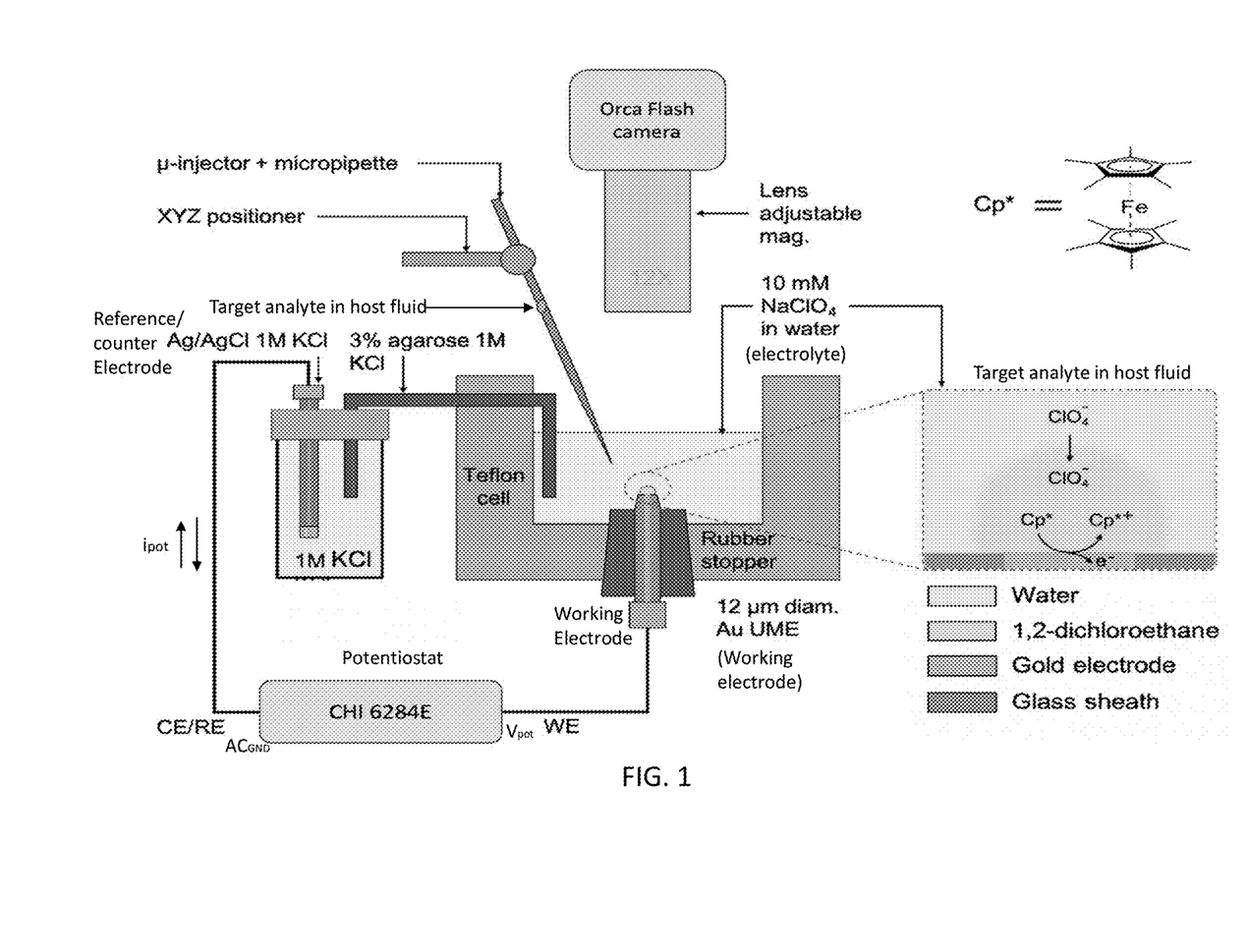
FIG. 1 is a schematic of an actual reduction to practice of the system of the present disclosure.
Figure 2:
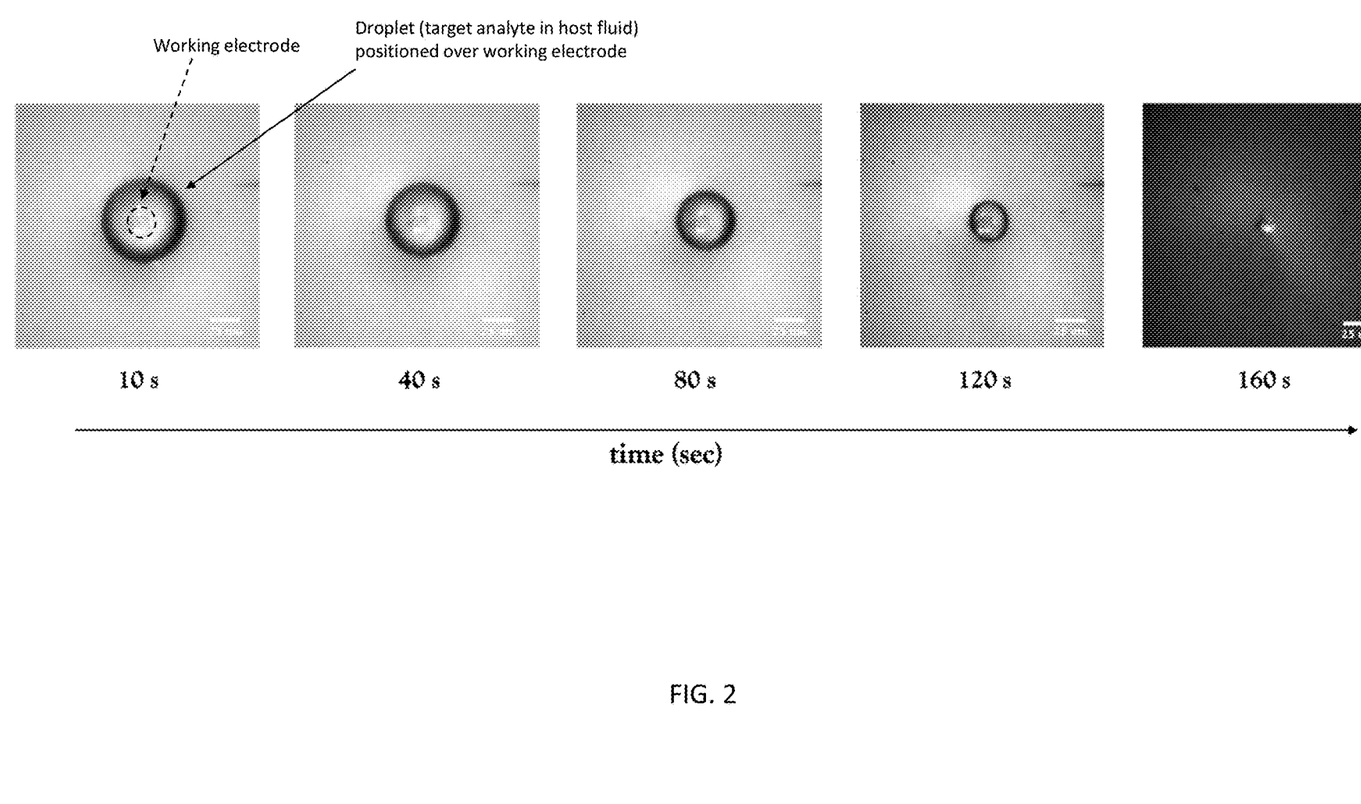
FIG. 2 provides photographs illustrating the reduction in size of the droplet (i.e., the target analyte in the host fluid) as a function of time in seconds.

Thus, a system and method is disclosed which provides electrochemical measurements is sub-nL droplets dissolving in another liquid phase. These measurements allow tracking the dissolution of the droplet and enable electrochemical detection of ultra-low concentration of analyte initially present in the droplet. An actual reduction to practice is provided using a schematic setup shown in FIG. 1. 40-70 µm radius droplets of 1,2-dichloroethane (host fluid) spiked with 0.5 mM decamethyl ferrocene (Cp*) (target analyte, i.e., substance of interest) are deposited on demand onto a 6.25 µm radius gold electrode (working electrode) disposed in a first vessel using a micro-injector. A 3 mL aqueous continuous phase containing 10 mM $NaClO_4$ (electrolyte) surrounds the droplet (i.e., the target analyte in the host fluid). The aqueous phase is acting as an "infinite" sink where the 1,2-dichloroethane is dissolving and also provides a convenient way to establish electrical contact with a counting electrode (Ag/AgCl 1M KCl) in the aqueous phase. It should be noted that while the counting electrode is shown as being disposed in a second vessel with a salt bridge between the first and second vessels, the counting electrode can be disposed in the first vessel, thus dispensing with the second vessel altogether as well as the salt bridge. Using cyclic voltammetry and amperometry, we can observe the effect of droplet dissolution (pre-concentration of the analyte in the droplet) on the voltammograms and track the rate of dissolution of a single microdroplet (i.e., the dissolution of the host fluid) of sub-nano liter volume (as shown in FIG. 2, which are photographs illustrating the reduction in size of the droplet (i.e., the target analyte in the host fluid) as a function of time in seconds). Accordingly, the method of the present disclosure allows "spontaneous" pre-concentration of the analyte by factors of hundreds to thousands within few minutes and can be used for sensing trace.

It should be noted that the target analyte concentration is defined according to one embodiment as the mass of the target analyte to the volume of the droplet. Thus, as the droplet's volume decreases, vis-à-vis dissolution of the host fluid into the electrolyte, the concentration of the target analyte increases, relatively. This relative increase in concentration is clearly shown in FIG. 2 where at 10 s the volume of the droplet is comparatively larger than the volume of the droplet at 160 s (about 200 times larger). This change in volume is recorded by the camera positioned above the first vessel, specifically above the working electrode. A close inspection of the droplets shown in FIG. 2, reveals the working electrode in the center of the droplet.

Figure 3:
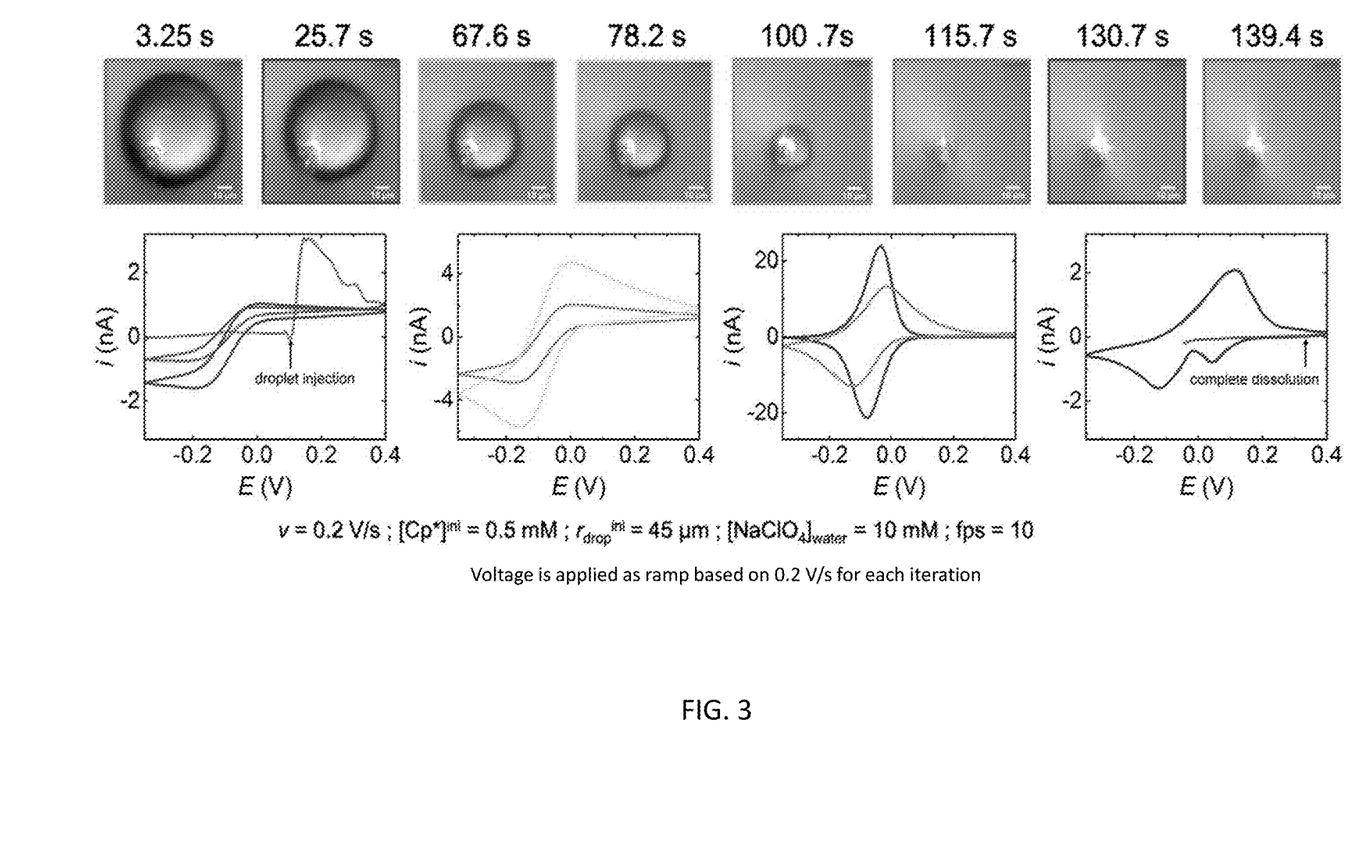
FIG. 3 provides photographs of droplet sizes after 3.25 seconds, i.e., shortly after the droplet is deposited on top of the working electrode, to 139.4 seconds, i.e., at complete dissolution of the host fluid, along with graphs of current in nA vs. oxidative potentials in V provided as cyclic voltammogram 'duck-shaped' plots generated by cyclic voltammetry in which sweeps starting at −0.4V to 0.4V.

Thus, by employing the system and method of the present disclosure, we demonstrate the detection of 10 nM of Cp* in the droplet (as shown in FIG. 3, which provide photographs of droplet sizes after 3.25 seconds, i.e., shortly after the droplet is deposited on top of the working electrode, to 139.4 seconds, i.e., at complete dissolution of the host fluid, along with graphs of current in nA vs. oxidative potentials in V provided as cyclic voltammogram 'duck-shaped' plots generated by cyclic voltammetry in which sweeps starting at −0.4V to 0.4V). The first set of two plots of current vs. potential is for 3.25 seconds and 25.7 seconds, respectively. The second set of two plots of current vs. potential is for 67.6 seconds and 78.2 seconds, respectively. The third set of two plots of current vs. potential is for 100.7 seconds and 115.7 seconds, respectively. The fourth set of two plots of current vs. potential is for 130.7 seconds and 139.4 seconds, respectively. The voltage sweep is at 0.2 V/s where the initial target analyte was at 0.5 mM and the initial droplet size is 45 µm. Referring to FIG. 1, the voltage is supplied by CHI 6284E (made by (CH INSTRUMENTS) which also measures current between the working electrode and the counting electrode. The voltage is applied according to a ramp, as discussed herein, according to one embodiment, e.g., based on a rate of 0.2 V/s. Such low concentration could not be directly detected electrochemically in a large continuous phase. Another advantage of using droplets is the extremely small volume of sample (sub-nL) required for the detection. Thus, our methodology is adapted for detection of trace biomolecules, heavy metals and nanoparticles.

Figure 4:
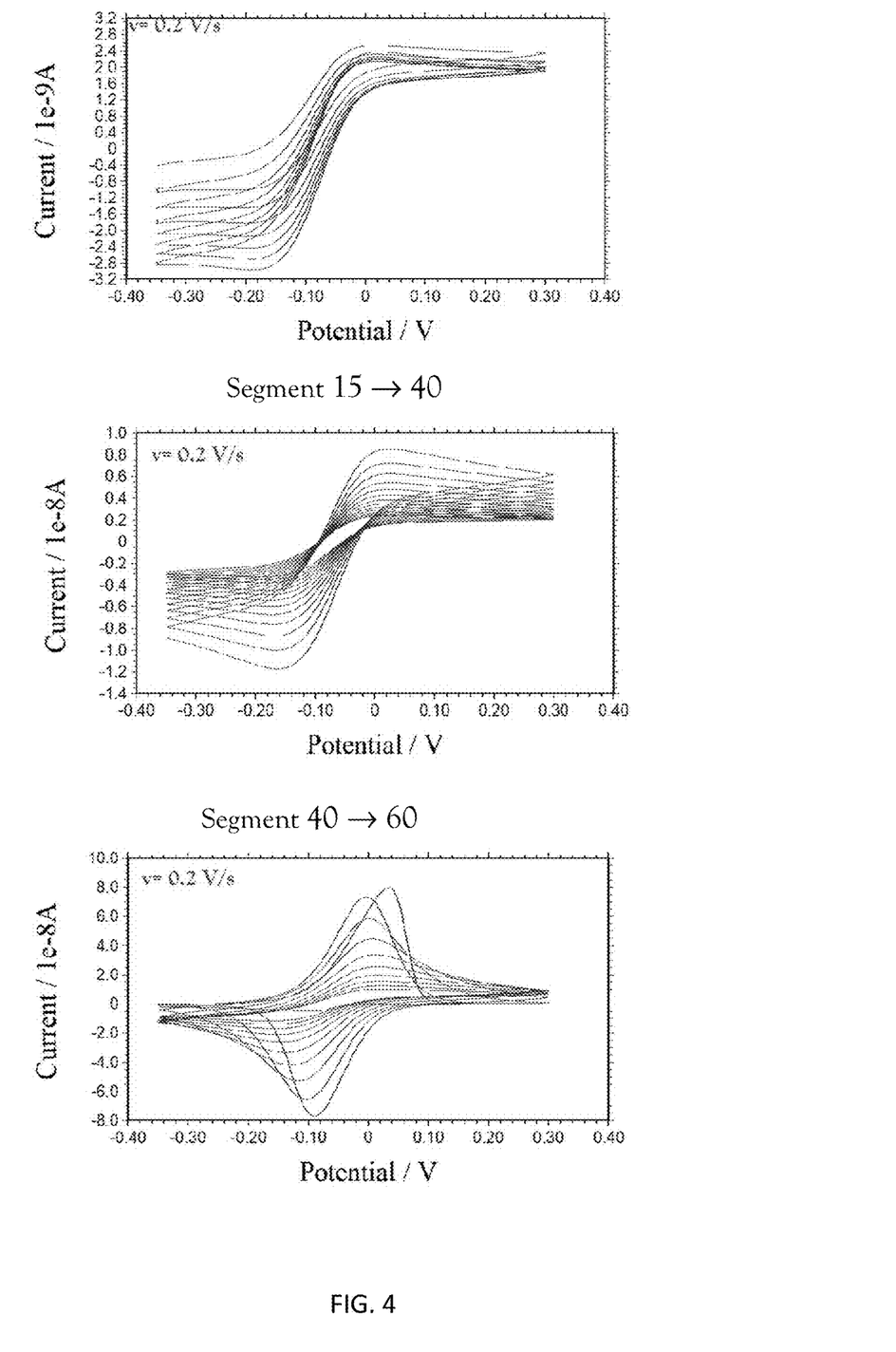
FIG. 4 provides voltammetry plots from the an experiment according to the present disclosure, representing 60 segments (2 segments constitute 1 voltammetry cycle) at 0.2 V/s sweep rate.

Referring to FIG. 4, voltammetry plots are shown from the above-described experiment, representing 60 segments (2 segments constitute 1 voltammetry cycle) at 0.2 V/s sweep rate. The initial droplet size is 50 µm in radius, representing $5.236 \times 10^{-10}$ L in volume ($4/3 \times pix \times (radius \times 0.00001)^3$). Concentration in moles is determined as provided below to be $5.00 \times 10^{-4}$ M. The initial charge transferred then is determined by Volume×Concentration×96485, which results in $2.53 \times 10^{-8}$ C. Charge transfer during the experiment is determined by integration. Q obtained by integration ($Q_{integrated} = 2.42 \times 10{-8}$ C) is comparable to the value of charge that was initially present ($Q_{initial} = 2.53 \times 10{-8}$ C) in the droplet. Therefore, the analyte doesn't leave the droplet and is contained. In the initial few segments the curves resemble sigmoid shapes and in the last segments, the curves are bell-shaped which are usually obtained in thin-layer electrochemistry. In these curves, the redox peaks and oxidation peaks are pronounced as the electroactive species found in the target analytes have a more pronounced role with the shrinking size of the droplet.

The concentration is determined by determining current vs. voltage curves, i) the current starts at about zero and returns to zero (i.e., initial and final values); and ii) where the current is determined to have peaked between the initial and final values. Therefore, a processor executing software on a non-transient memory follows the current vs. voltage curves, dynamically or in real-time. When the initial and final current values are seen to be about zero, the processor begins to look for a maximum in the current. This is done by monitoring which peak in current vs. voltage curves represents the highest. For each such curve, since the sweep rate of the voltage is known (e.g., 0.2 V/sec), the voltage axis can be converted to a time axis (i.e., current vs. time). For each such curve (i.e., current vs. time) in real-time or only for the curve representing the maximum current, the area under the current curve is integrated to yield charge in Coulombs.

Once the charge is known, using the formula (see above for an example) $Q=n \cdot F$, where Q is the integrated charge, n is the number of moles, and F is the Faraday's constant (i.e., 96485 C/M), the number of moles can be related to concentration of target analyte by expressing $n=C \cdot V$, where C is the concentration of the target analyte in Moles/L and V is the size of the droplet in liters. Therefore, $C=Q/(V \cdot F)$. The volume can be calculated analytically based on diffusion-based equations, known to a person having ordinary skill in the art, or by a pre-experimental knowledge utilizing the camera shown in FIG. 1 and monitoring size of the droplet as a function of time. Therefore, when the maximum current vs. voltage curve has been identified by the processor, the volume of the droplet is known from apriori knowledge obtained from the camera. It should be noted that this time is not the same time as that which the current is integrated over (i.e., one is the time into experiment, and the other is the time within a particular voltammetry cycle). Once the volume is known and the charge is known, concentration if the analyte in Moles/L can be calculated by the processor. It should be noted that while the maximum current vs. voltage provides the best sensitivity, a lower value above a predetermined threshold above zero for the peak of the current vs. voltage curve may also provide sufficient sensitivity. Therefore, alternative to determining maximum current vs. voltage curve provided above, the processor may seek for a curve that represents a peak having a value at least equal to a predetermined value and repeat the information provided above to determine concentration.

Figure 5:
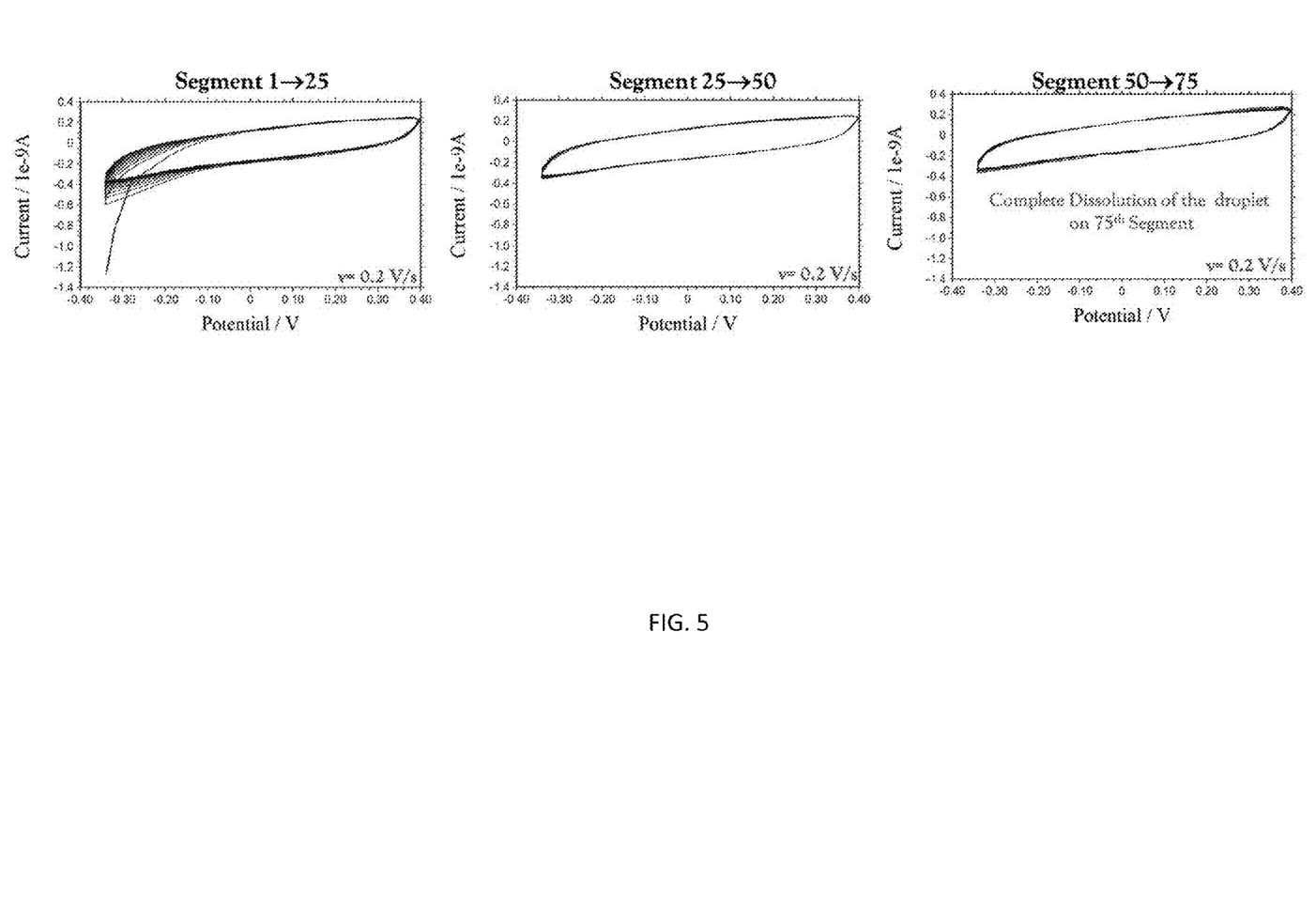
FIG. 5 provides voltammetry curves for droplets without target analytes for again 60 segments.

Referring to FIG. 5, voltammetry curves for droplets without target analytes are shown for again 60 segments. Here, the droplet only contains 1,2-DCE, and the cyclic voltammogram measures current as a function of potential as the droplet is shrinking in volume with time. There are no redox or oxidation peaks anywhere, as there is no electroactive species since there is no target analyte present inside the droplet.

Figure 6:
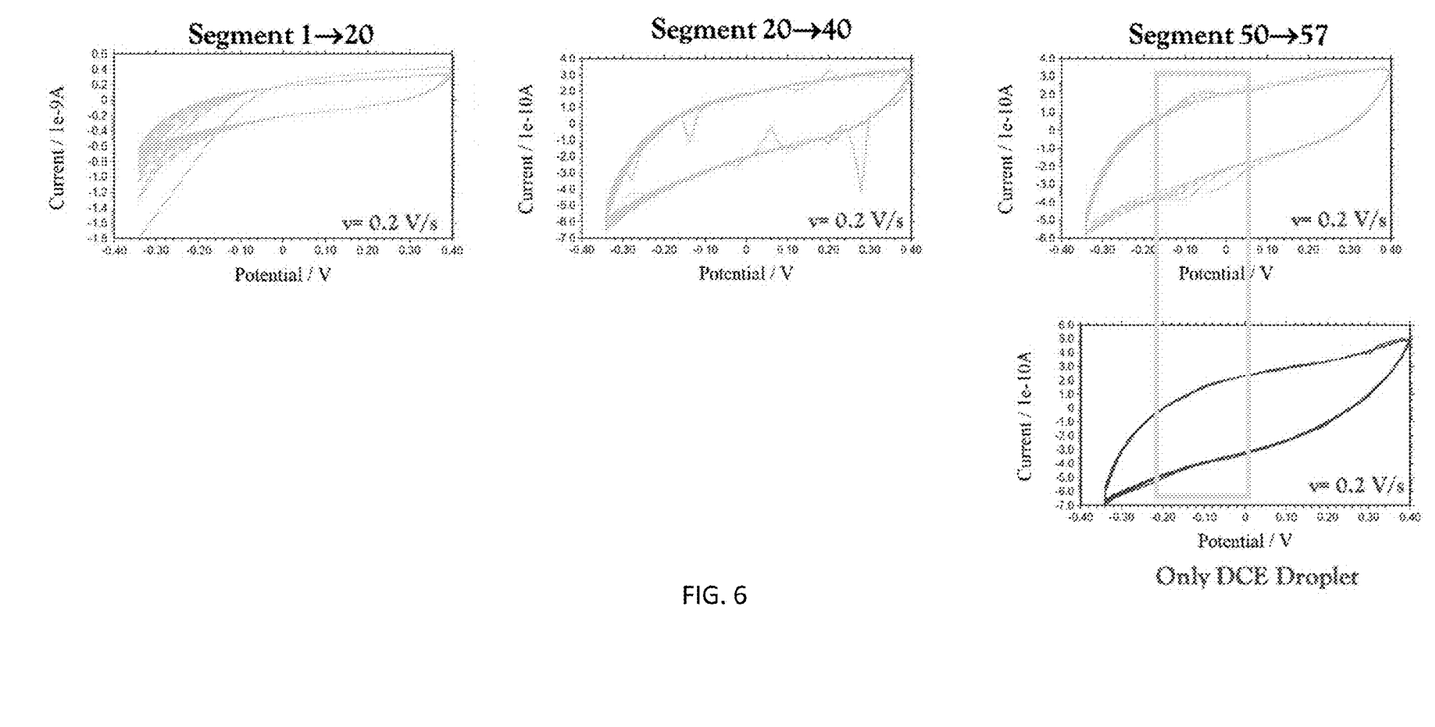
FIG. 6 provides voltammetry plots showing results of the experiment for ultra-low concentration of target analyte (10 nM).
Figure 7A:
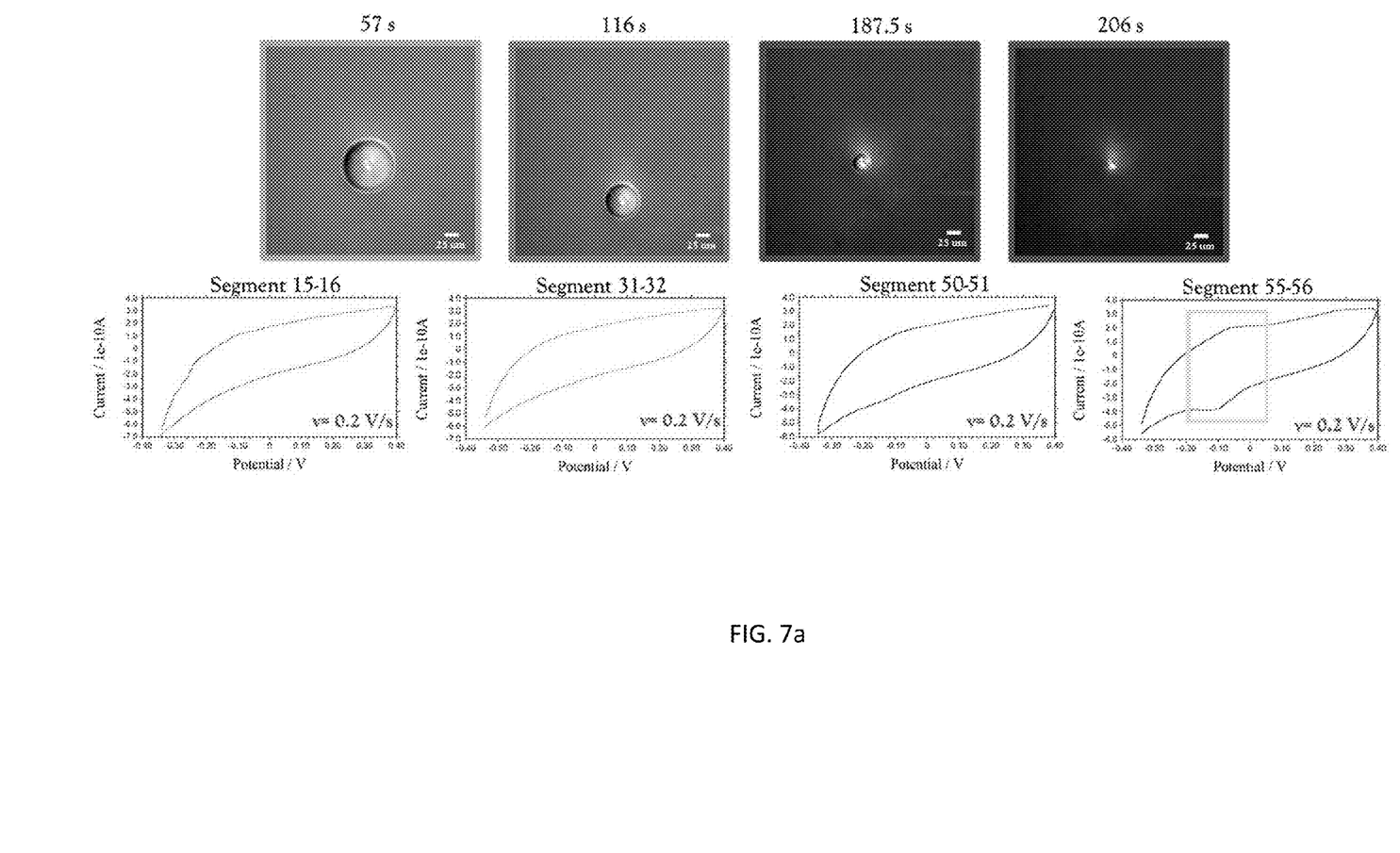
FIG. 7a provides voltammetry plots in connection with photographs to show how ultra-low concentrations of target analyte are determined.

Referring to FIG. 6, voltammetry plots showing results of the experiment for ultra-low concentration of target analyte (10 nM) are provided. Here, the droplet contains 10 nM of Cp* in 1,2-DCE, and the cyclic voltammetry is performed as the droplet dissolves (pre-concentration of Cp*) with time. Initially, no redox activity is observed at about −0.1 V. However, as the droplet dissolves and thus the concentration of target analyte increases, vis-à-vis reduction in size of the droplet, we can finally sense Cp* and get peaks of about −0.1 V, as compared to the reference plot shown in FIG. 5 where the droplet has no target analyte. Such low concentrations could not be directly detected electrochemically in a large continuous phase Referring to FIG. 7a, voltammetry plots in connection with photographs are provided to show how ultra-low concentrations of target analyte are determined. The target analyte constitutes 10 nM of Cp* in 1,2-DCE. The electrolyte is made up of 10 mM NaClO4 in deionized (DI) water. Here, we show the origin of peaks around −0.1 V in the presence of 10 nM Cp* in the droplet. Initially, the droplet is 75 μm in diameter and no signal is observed. However, as the droplet pre-concentrates Cp*, we can see the peaks arise at about 200 sec. There are 60 segments, and the first two plots represent 57 seconds and 116 seconds, respectively. The next two plots represent 187.5 seconds and 206 seconds. In the 206 seconds the plots show clear redox and oxidation peaks as illustrated by the yellow box.

Figure 7B:
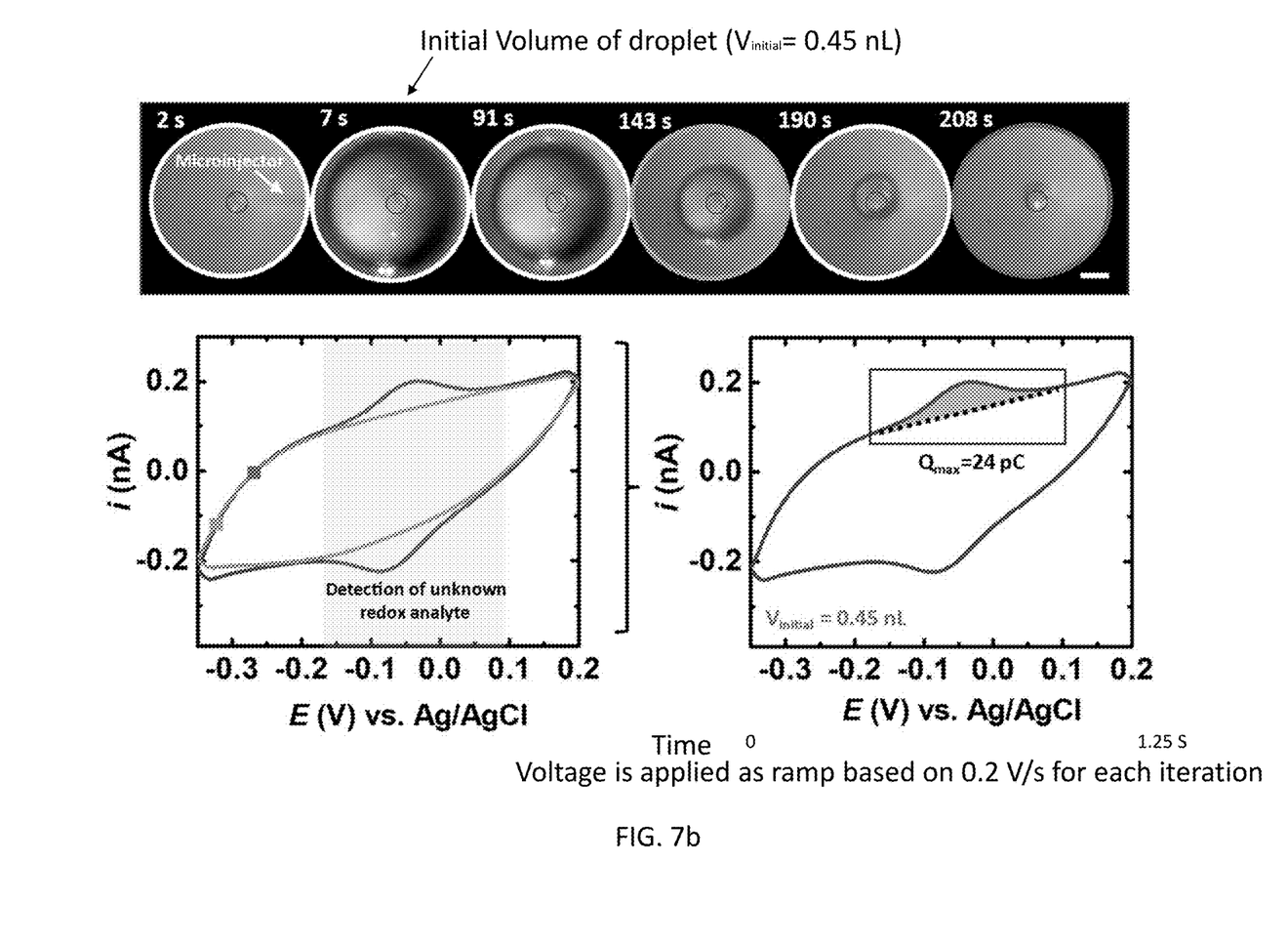
FIG. 7b is a more detailed example of voltammetry plots showing reduction of volume of the droplet while identifying the redox peak and converting the voltage to a time axis and then integrating the area under the curve in order to calculate the initial concentration.

Referring to FIG. 7b, a more detailed example is shown. As seen in FIG. 7b, the droplet volume decreases from the initial volume captured by a image capturing device. The initial volume is calculated from the image to be 0.45 nL. Thereafter, the redox peak is identified. The Voltage axis is converted to a time axis, since the voltage is based on a ramp of 0.2 V/s. Thus the entire 0.5 V (i.e., from −0.3 V to 0.2 V) occurs in 1.25 seconds. Once the voltage axis is converted to a time axis, the area under the redox preak (shaded area) is integrated in order to find the associated charge. The calculated charge can then be converted to a concentration based on the initial volume using Faraday's law discussed herein.

Figure 8:
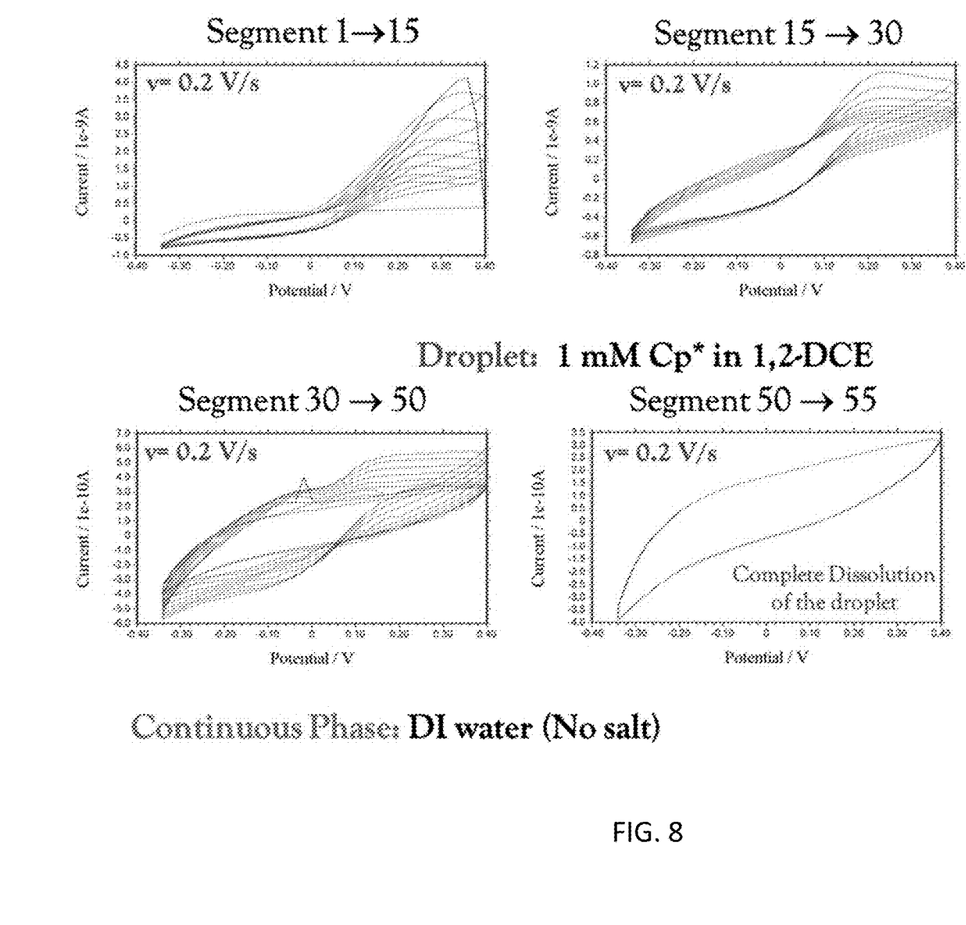
FIG. 8 provides voltammetry plots with no salt present in the electrolyte solution.

Referring to FIG. 8, voltammetry plots are shown with no salt present in the electrolyte solution. These plots show that the idea of preconcentrating the droplet in the absence of any salt in the aqueous continuous phase (i.e., the electrolyte) is also possible and is evident in the voltammograms shown above. It must be noted that the voltammogram is shifted to the right and the peaks are centered around 0.2 V, as opposed to −0.1 V in the presence of salt in the continuous phase. This is due to the ohmic drop caused by the absence of salt. But the novel methodology of tracking the dissolution with preconcentration of the analyte still holds true even in the absence of any salt in the continuous phase.

Figure 9:
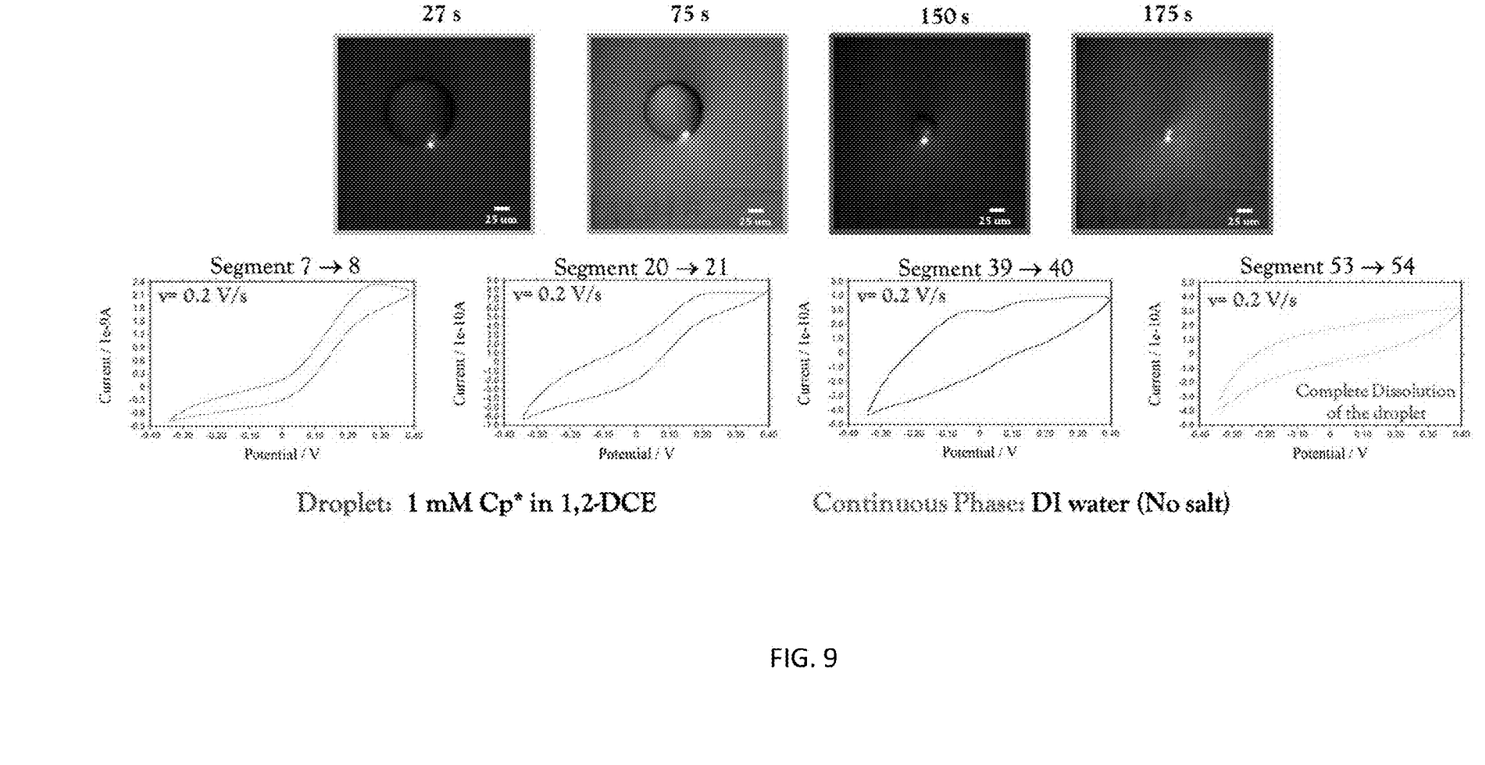
FIG. 9 provides voltammetry plots in connection with photographs again in the absence of any salt in the electrolyte.

Referring to FIG. 9, voltammetry plots in connection with photographs are provided again in the absence of any salt in the electrolyte. As shown, the effect of shrinking the droplet (preconcentration of the droplet) is evident on the voltammograms, thus providing tracking the dissolution kinetics of the droplets even in the absence of any salt in the continuous phase.

Figure 10:
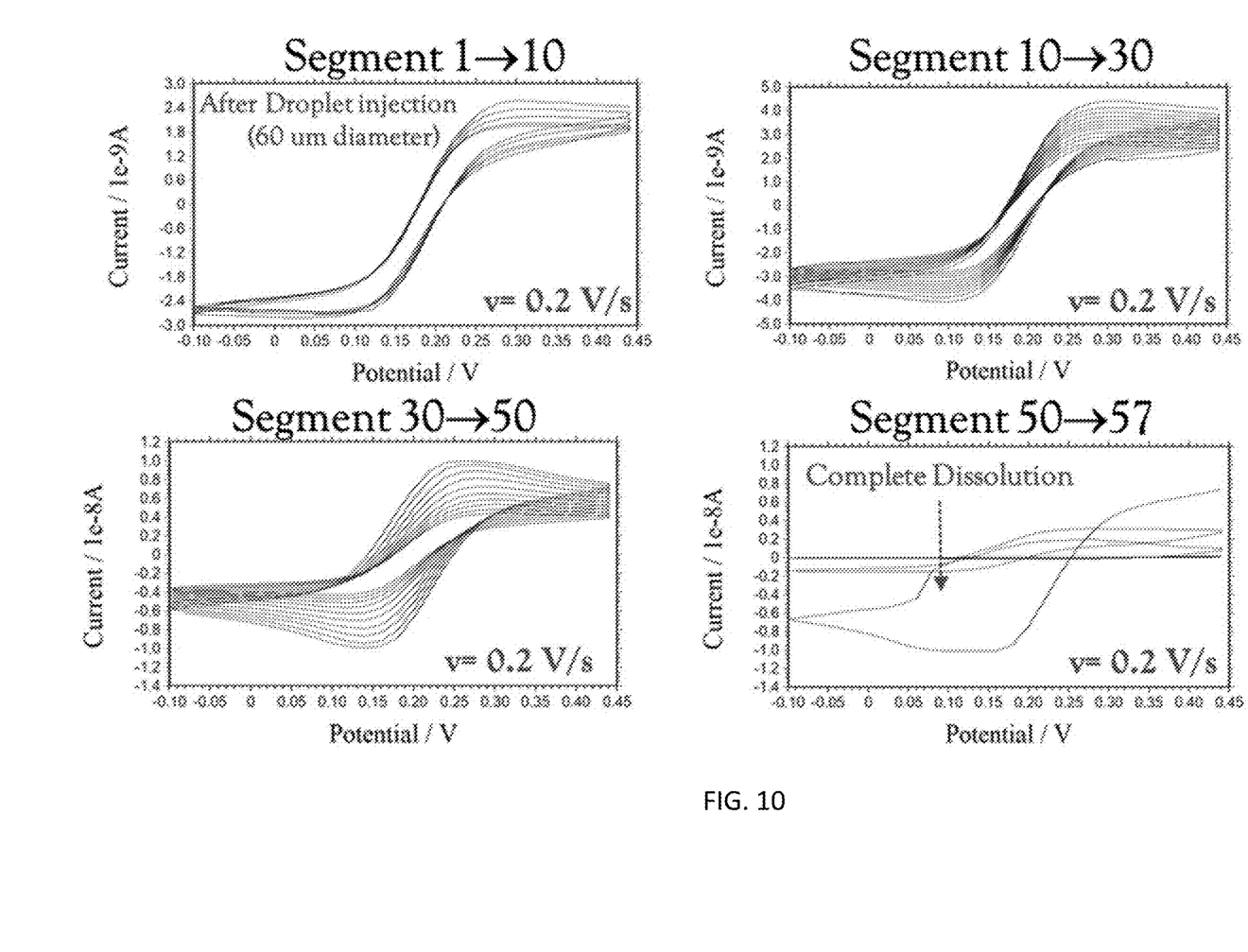
FIG. 10 provides voltammetry plots in an inverse system where water droplets are in oil phase.

Referring to FIG. 10, voltammetry plots are shown in an inverse system where water droplets are in oil phase. Here we demonstrate that the system of the present disclosure is versatile and can be used in various configuration, i.e., water droplets in oil phase or oil droplets in water phase. For example, similar experiments were performed with water droplets in oil phases such as silicone oil, turpentine oil, etc. The voltammograms shown in FIG. 10 depict the preconcentration of ferricyanide in water. The voltammograms are centered at about 0.2 V, which is the formal potential for $Fe^{+3}/Fe^{+2}$ in water. This feature of the system is very crucial for the ultra-low concentration sensing application of analytes that are of broad interest. For example, the majority of the biomolecules are soluble only in the aqueous phase and not in organic solvents.

Figure 11:
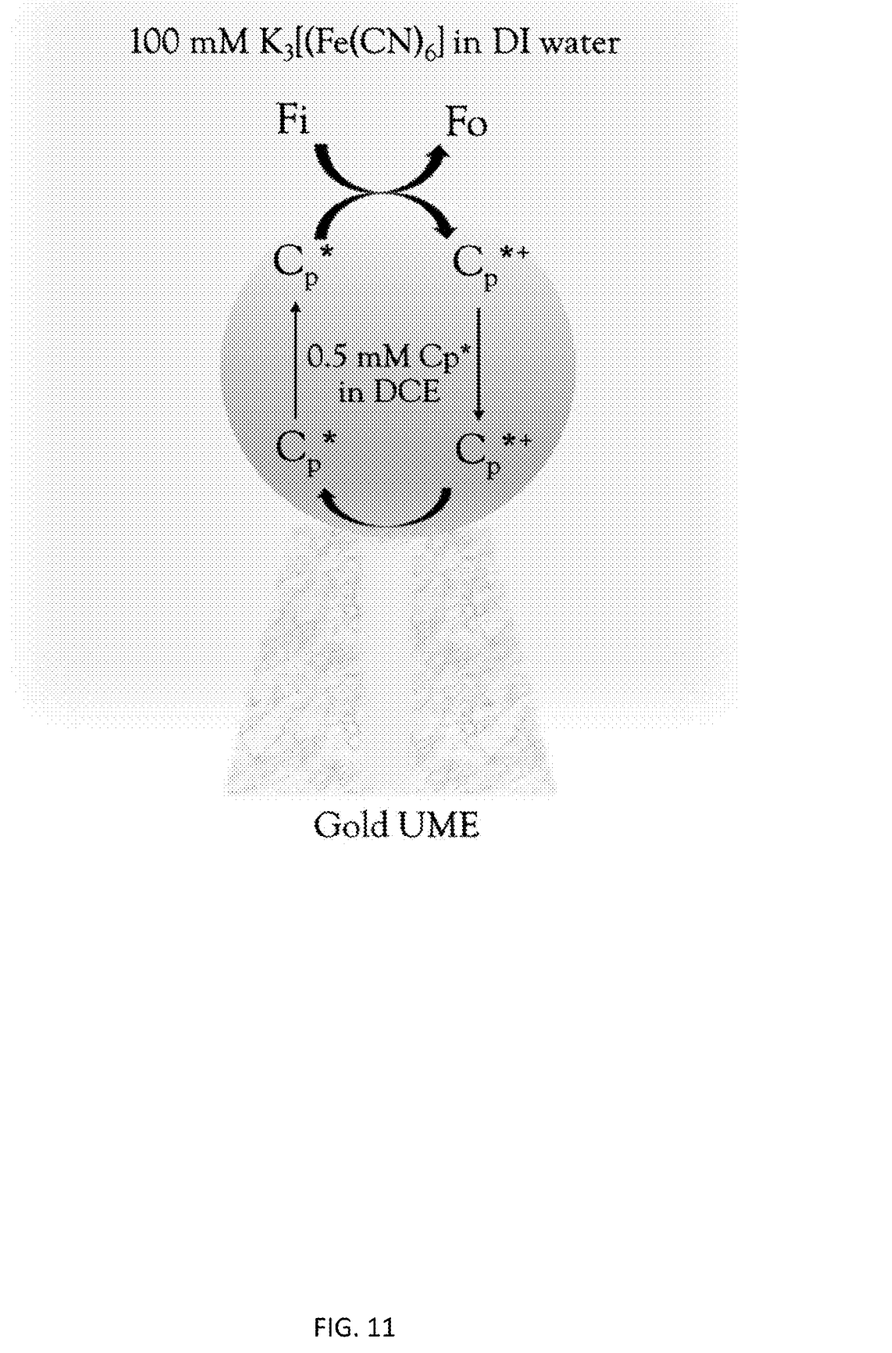
FIG. 11 is a schematic for signal amplification according to the present disclosure.
Figure 12:
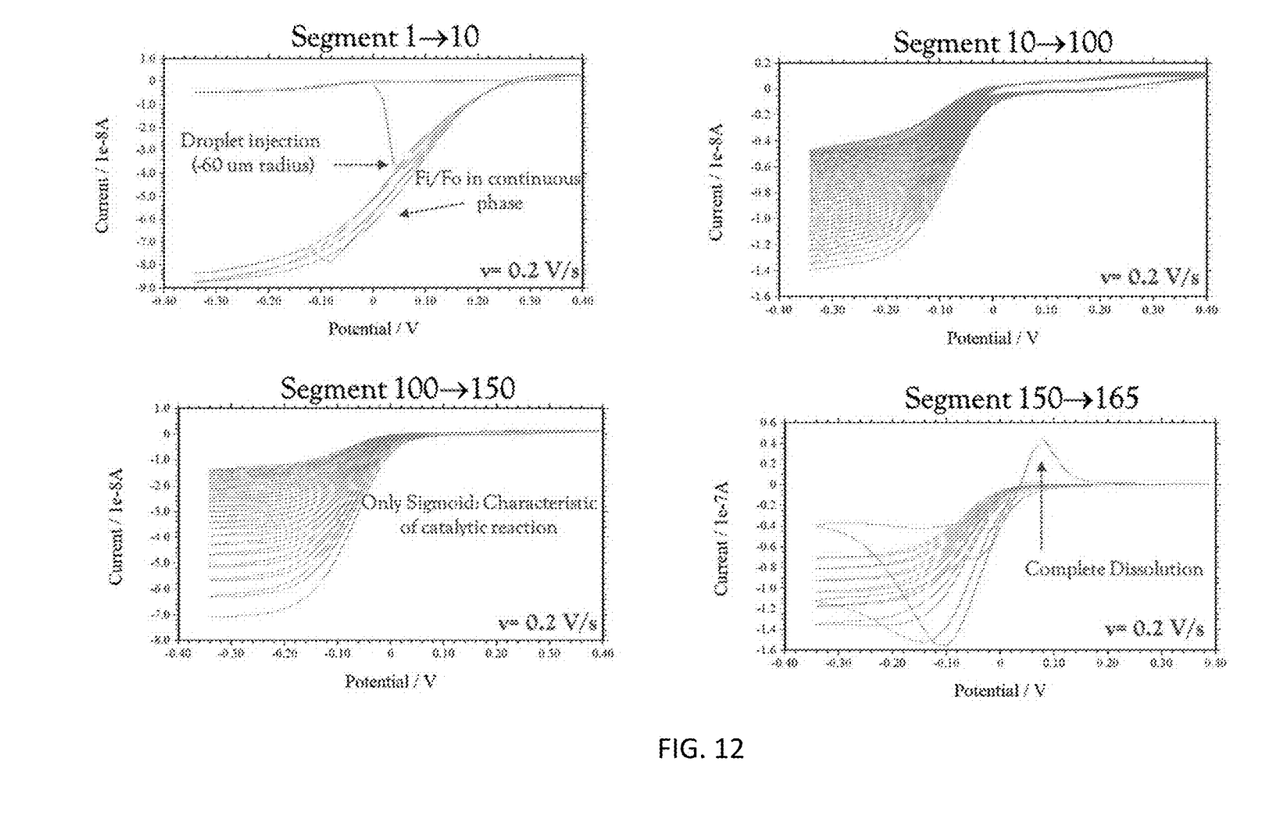
FIG. 12 provides plots of current in A vs. potential in V which reveal that a number of sigmoid are seen as the droplet dissolves and never peaking behavior, which is usually observed when there is 10 mM $NaClO_4$ in the continuous phase.

Referring to FIG. 11, a schematic is shown for signal amplification according to the present disclosure. The setup is similar to the previous cases: the droplet contains Cp* in 1,2-DCE, and the continuous phase contains 100 mM potassium ferricyanide (10 mM $NaClO_4$ previously). A close inspection at the voltammograms provided in FIG. 12 reveals that a number of sigmoid are seen as the droplet dissolves and never peaking behavior, which is usually observed when there is 10 mM $NaClO_4$ in the continuous phase. This sort of behavior is typical of a catalytic reaction, as shown in the schematic shown in FIG. 11.

Those having ordinary skill in the art will recognize that numerous modifications can be made to the specific implementations described above. The implementations should not be limited to the particular limitations described. Other implementations may be possible.

The invention claimed is:
1. A system for measuring ultra-low concentration of a target analyte in a host fluid, comprising:
   a first vessel having an electrolyte disposed therein,
   a first electrode in electrochemical contact with the electrolyte;

a second electrode in electrochemical contact with the electrolyte;

a micro-positioner coupled to a micropipette having an ejection tip, and configured to position the ejection tip atop the first electrode such that a droplet having an initial radius comprising of a target analyte in a host fluid can be deposited atop the first electrode;

an image capture device configured to capture images of the first electrode with the droplet disposed atop the first electrode as the droplet changes size from the initial radius to radii smaller than the initial radius, until the host fluid is completely dissolved into the electrolyte;

a voltameter device coupled between the first electrode and the second electrode and configured to iteratively apply a potential to the first electrode and measure electrical current between the first electrode and the second electrode based on a predetermined voltage sweep rate; and a processor running software on a non-transient memory and configured to:
obtain current vs. voltage curves for each voltameter iteration,
identify redox or oxidation peak for each voltameter iteration based on a predetermined criterion,
determine target analyte concentration based on the identified redox or oxidation peaks on the basis of:
determine determining an initial volume of the droplet from the image capture device,
converting the voltage axis of the current vs. voltage curves to time based on the predetermined voltage sweep rate,
integrating the current values vs. time in the converted current vs. time curves for the identified redox or oxidation peaks, and
calculating a concentration of the target analyte in the droplet.

2. The system of claim 1, wherein the predetermined criterion represents a maximum value of current of the identified redox or oxidation peaks.

3. The system of claim 1, wherein the predetermined criterion represents a value of current of the identified redox or oxidation peaks higher than zero by a predetermined threshold, wherein initial and final current values of the current is about 0 A.

4. The system of claim 1, wherein the ultra-low concentration represents at least 10 nM of the target analyte.

5. The system of claim 1, wherein the second electrode and the first electrode are disposed in the first vessel.

6. The system of claim 1, wherein the second electrode is disposed in a second vessel while the first electrode is disposed in the first vessel.

7. The system of claim 6, wherein the second electrode is in electrochemical contact with the electrolyte via a salt bridge.

8. The system of claim 1, wherein the electrolyte is $NaClO_4$ in water.

9. The system of claim 1, wherein the first electrode is made up of a 12 µm gold electrode.

10. The system of claim 1, wherein the second electrode is made up of an Ag/AgCl electrode.

11. A method of measuring ultra-low concentration of a target analyte in a host fluid, comprising:
placing a droplet by a micropipette having an ejection tip, positioned by a micro-positioner, configured to position the ejection tip atop a first electrode in electrochemical contact with an electrolyte disposed in a first vessel, such that a droplet having an initial radius comprising of a target analyte in a host fluid can be deposited atop the first electrode;
iteratively applying a potential to the first electrode and measuring electrical current between the first electrode and a second electrode in electrochemical contact with the electrolyte based on a predetermined voltage sweep rate;
obtaining current vs. voltage curves for each voltameter iteration,
identifying redox or oxidation peaks for each voltameter iteration based on a predetermined criterion,
determining target analyte concentration based on the identified redox or oxidation peaks based on:
determining an initial volume of the droplet from an image capture device,
converting the voltage axis of the current vs. voltage curves to time based on the predetermined voltage sweep rate,
integrating the current values vs. time in the converted current vs. time curves for the identified redox or oxidation peaks,
and
calculating a concentration of the target analyte in the droplet.

12. The method of claim 11, wherein the predetermined criterion represents a maximum value of current of the identified redox or oxidation peaks.

13. The method of claim 11, wherein the predetermined criterion represents a value of current of the identified redox or oxidation peaks higher than zero by a predetermined threshold, wherein initial and final current values of the current is about 0 A.

14. The method of claim 11, wherein the ultra-low concentration represents at least 10 nM of the target analyte.

15. The method of claim 11, wherein the second electrode and the first electrode are disposed in the first vessel.

16. The method of claim 11, wherein the second electrode is disposed in a second vessel while the first electrode is disposed in the first vessel.

17. The method of claim 16, wherein the second electrode is in electrochemical contact with the electrolyte via a salt bridge.

18. The method of claim 11, wherein the electrolyte is $NaClO_4$ in water.

19. The method of claim 11, wherein the first electrode is made up of a 12 µm gold electrode.

20. The method of claim 11, wherein the second electrode is made up of an Ag/AgCl electrode.

* * * * *